Patented Oct. 18, 1932

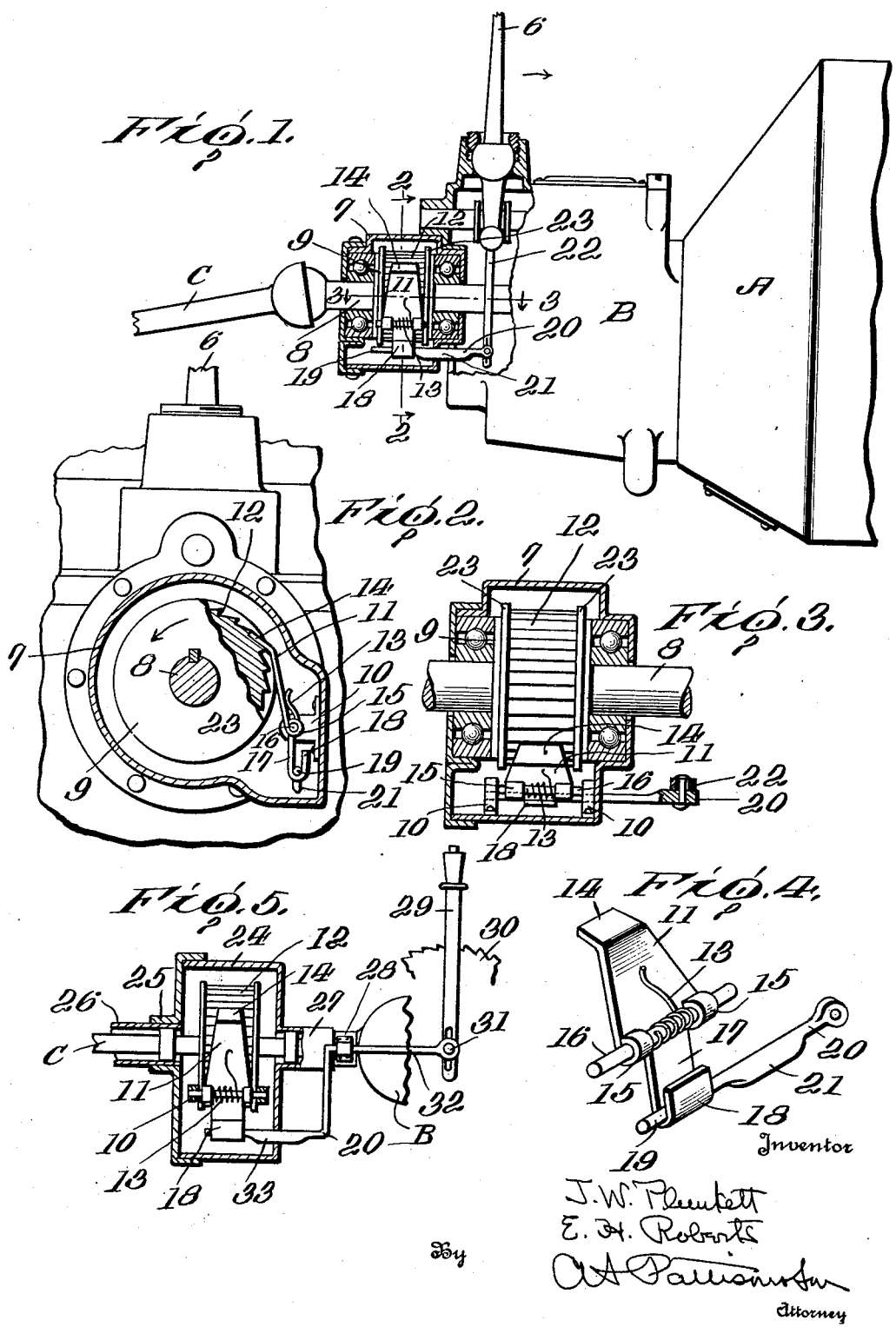

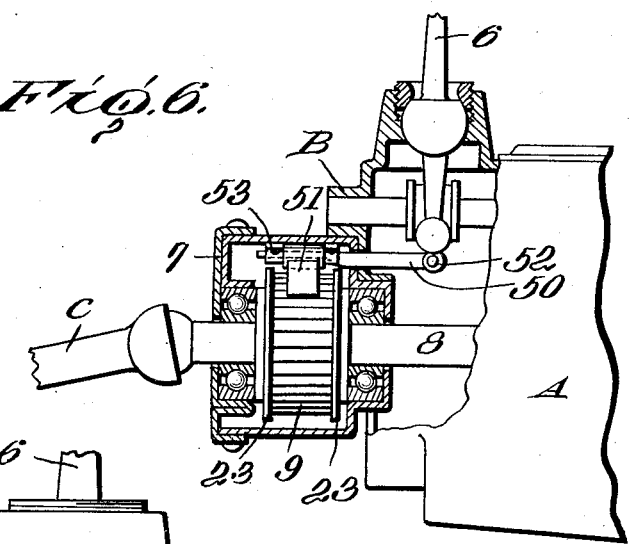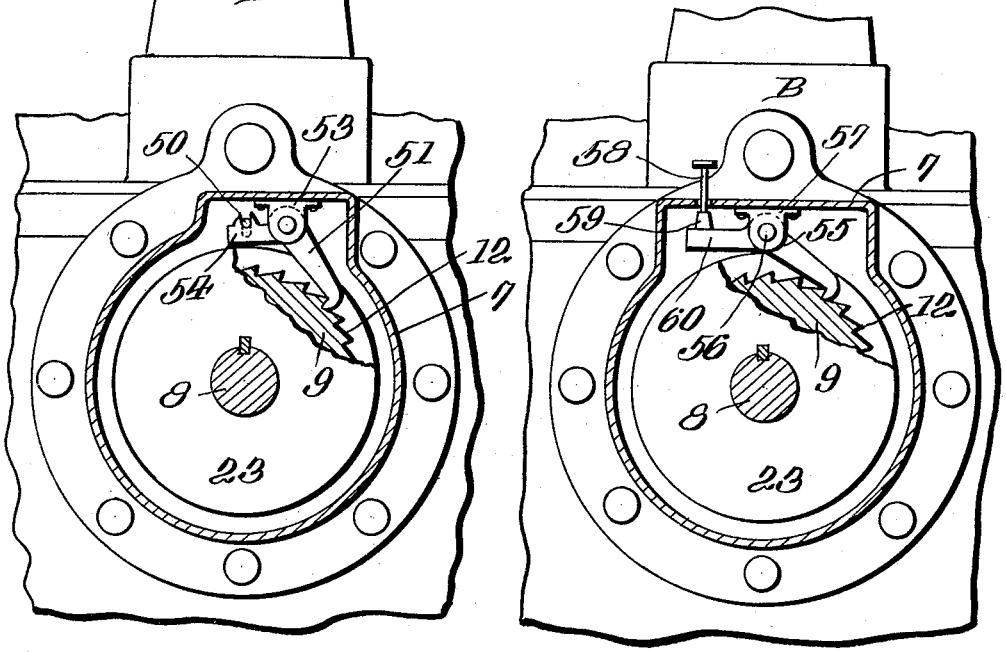

1,883,820

UNITED STATES PATENT OFFICE

JOHN W. PLUNKETT AND EDWARD H. ROBERTS, OF ORANGE, MASSACHUSETTS

STOP DEVICE FOR AUTOMOBILES

Application filed June 22, 1929, Serial No. 372,890. Renewed August 23, 1932.

This invention relates to improvements in stop devices for automobiles being directed more specifically to a positive lock on the drive shaft of an automobile to prevent the machine from coasting backwards when it is left standing.

The primary object of the invention is the provision of a stop or locking device for the drive shaft of automobiles or other vehicles.

Another object of the invention is the provision of a stop or locking device for the drive shaft of vehicles to prevent the backward motion of the vehicle, which stop device is in the form of a positive lock against the rotation of the automobile drive shaft.

Another and further object of the invention is the provision of a device of the character described which is cheap and simple of manufacture and highly efficient in operation.

A still further object of the invention is the provision of a device of the character described which can be either built into the automobile or vehicle or can be sold as an attachment for an automobile or other like vehicle.

Other objects, novel features of construction and improved results of the invention will appear from the following description and accompanying drawings.

In the drawings: Figure 1 is a view in side elevation of a motor vehicle transmission housing and drive shaft, the improved stop device being illustrated as a built-in unit, a portion of the view being in vertical section to better illustrate the invention.

Figure 2 is a transverse vertical sectional view on a line 2—2 of Figure 1 looking in the direction indicated by arrow.

Figure 3 is a horizontal section taken on a line 3—3 of Figure 1 looking in the direction indicated by arrow.

Figure 4 is an enlarged detailed perspective view of the locking dog and the releasing mechanism therefor.

Figure 5 is a vertical sectional view illustrating a modified form of the invention.

Figure 6 is a view in side elevation of a motor vehicle transmission housing and drive shaft, a modified form of the improved stop device being illustrated therewith, a portion of the view being in vertical section to better illustrate the invention.

Figure 7 is a transverse vertical sectional view through the construction appearing in Figure 6.

Figure 8 is a transverse vertical sectional view of a still further modification of the invention.

Referring now to the drawings in which like parts are designated by similar reference numerals throughout the description, it will be seen that A designates the rear end of an automobile motor, B the transmission and C the drive shaft for transmitting power for rotation of the rear wheels of the car.

The transmission shifting lever is designated at 6 and is for the well known purpose of shifting the gears within the transmission housing B which gears incidentally are not shown as they form no part of the present invention.

In that form of the invention where it is our intention that our improved stop device be built into the machine, it will be seen that we have provided an oil tight housing or casing 7 mounted upon and surrounding the stub shaft 8 which interconnects the transmission with the drive shaft C.

Upon this stub shaft 8 we provide a gear wheel 9 which is keyed or otherwise fixed upon the shaft 8 so as to rotate with it at all times.

Rotatably supported within the housing 7 upon suitable bearings 10 we have provided a dog 11 which at all times engages the gear teeth 12 of the gear 9 due to the fact that it is pressed into engagement with the gear teeth by the spring action of the coil spring 13.

The construction of the gear teeth is such that when the drive shaft is rotating in a direction to drive the gear forward the teeth of the gear wheel readily pass under and past the dog 11, but in the event of a reversal of direction of movement of the drive shaft and its stub shaft 8 the dog 11 positively engages the gear teeth 12 locking the drive shaft, and consequently the vehicle, against rotation in a direction which would permit any rearward movement of the vehicle.

By reference to Figure 4 of the drawings it will be seen that the dog 11 is provided with an inwardly extending end 14 so bent as to properly engage the gear teeth and at the opposite sides of its other end is bent backwardly upon itself as at 15 to provide eyes through which the shaft 16 passes, which shaft is in turn rotatably supported in the bearings 10.

This dog is also provided with an extending end 17 curled backwardly upon itself as at 18 to loosely receive the end 19 of the releasing rod 20. Intermediate its length this releasing rod is provided with a tapered portion 21 and the rod is reciprocated through engagement with a second rod 22 which is actuated by the lower end of the gear shifting lever 6 when this lever is operated to put the transmission gears into position to effect a reversing of the vehicle. Upward movement of the rod is prevented by the bearing 10.

From the foregoing it will be seen that normally a free rotation of the drive shaft is permitted as long as the drive shaft is rotated in a direction to effect a forward motion of the vehicle, but that the dog 11 is an absolute lock against any rotation of the drive shaft which would effect a rearward movement of the vehicle such as when the vehicle is parked or should the engine power fail when the vehicle is going up a hill.

It will also be seen that when it is desired to move the vehicle in a rearward direction this is possible because the movement given to the gear shift lever 6 to mesh the proper gears for reversing the vehicle will automatically move the release lever 20 in a rearward direction, thus causing the tapered portion 21 of the rod to engage and depress the end 18 of the extending dog end 17 inwardly thus automatically lifting the upper end 14 of the dog out of engagement with the gear teeth 12 of the gear 9.

As a safeguard against lateral displacement of the dog 11 the gear 9 has been provided at its edges with peripheral flanges 23.

In Figure 2 the direction of rotation of the gear 9 when the drive shaft is imparting forward motion to the vehicle is indicated by arrow, and it will be perfectly evident that the gear teeth will ride past the dog when the shaft is so rotating but that the dog will positively lock the gear and incidentally the drive shaft upon a reversal of direction of rotation of the gear unless said rotation is caused by an actual meshing of the reverse gears in the transmission housing.

The form of the invention as illustrated in Figure 5 is one which permits the application of our improved stop device to a vehicle already complete in its manufacture and in use or on sale.

Here again the drive shaft carries the letter C and the transmission housing the letter B.

The oil tight housing for the stop device appears at 24 being supported at one end as at 25 upon the tube covering 26 of the drive shaft while its other end 27 rests upon the bearing 28 immediately back of the transmission housing.

The construction of gear 9, dog 11, and coil spring 13 is similar to that described in respect to the other form of the invention.

Two features of difference in respect to this form of the invention are that the housing can be applied to a vehicle as an accessory and that the releasing of the dog is effected by a separate and independent lever 29 rather than by the gear shift lever.

The lever 29 is so constructed that it can be locked in any desired position through suitable engagement with a segment gear 30 and when moved it will, through its connection at 31 with the operating rod 32, reciprocate this rod causing the tapered portion 33 of the rod to release the dog from engagement with the teeth of the gear when desired.

Thus it will be seen that in this form of the invention the vehicle is at all times locked against the rear movement and when it is desired to reverse the vehicle it is necessary to manually actuate the lever 29 to effect a releasing of the dog.

Figures 6 and 7 of the drawings show a modified form of the invention. The construction here present is similar to that illustrated in Figure 1 of the drawings with the exception that the releasing rod designated at 50 and the dog 51 are positioned above the gear 9. In this form the drive shaft is designated as C, the rear end of the engine as A, the transmission housing as B, the gear shaft lever as 6, and the housing or casing for the gear 9 carries the numeral 7.

The construction illustrated in Figures 6 and 7 is somewhat simplified over that appearing in Figure 1 as the rod 22 is eliminated because the releasing rod 50 is attached directly to the lower end of the gear shaft lever, as appears at 52.

This releasing rod 50 is of similar construction to the releasing rod 20 in Figure 1 and the dog construction is practically the same, it being supported on suitable brackets 53.

The gear wheel 9 is also provided with peripheral flanges 23.

As is readily apparent in Figure 7 of the drawings, the dog has a rearwardly extending end portion 54 which is engaged and depressed by the rod 50 for releasing the dog from engagement with the teeth 12 of the gear.

In Figure 8 of the drawings a still further modification of the invention appears.

Here again the gear 9 is within the oil tight casing or housing 7 immediately back of the transmission housing B. The dog 55 is pivotally supported at 56 on a suitable bracket 57 attached to the under side of the top of the casing 7.

The dog falls by gravity to normally engage the teeth 12 of the gear and is released through the instrumentality of a foot pedal 58 the upper end of which is intended to extend beyond the floor boards of the machine, while the lower end is supported within a suitable cup or bearing 59 mounted upon the extending end 60 of the dog.

It will be readily apparent that the dog can be released from engagement with the gear by depressing the foot pedal 58.

Having thus described our invention what we claim and desire to secure by Letters Patent is:

1. A back stop brake for motor vehicles having a drive shaft, comprising an oil tight housing surrounding said shaft, a gear in said housing rotatable with said shaft, a pivotally mounted dog normally engaging said gear and locking it against rotation in one direction, flanges at the opposite edges of said gear to prevent lateral displacement of said dog, a sliding rod extending into said housing and provided with an enlarged portion, the dog provided with an extending end supporting one end of said rod, and means to reciprocate said rod and cause the enlarged portion thereof to engage the extending end of the dog and rock it upon its pivotal support to disengage the dog from the gear, for the purpose described.

2. A back stop brake for motor vehicles having a drive shaft, comprising a gear on said shaft rotatable therewith, a dog having ears at opposite sides of its center portion, a second shaft passing through said ears and rotatably supporting said dog, a coil spring normally holding said dog in engagement with the gear and locking it against rotation in one direction, said dog intermediate its ears provided with an extending portion supporting one end of a reciprocable rod having an enlarged portion, and manually operatable means for reciprocating said rod to cause the enlarged portion thereof to engage the extending end of the dog and rock it upon its pivotal support to a position out of engagement with said gear to permit free rotation of the drive shaft in both directions.

3. A back stop brake for motor vehicles having a drive shaft, comprising a gear mounted on and rotatable with said shaft, a dog pivotally mounted intermediate its length adjacent said gear and having one end adapted to engage the teeth of said gear to lock the gear against rotation in one direction, resilient means normally holding said dog in engagement with said gear teeth, said gear at its opposite edges peripherally provided with flanges to prevent lateral displacement of the dog in respect to the gear, the opposite end of said dog bent to receive a reciprocal rod, said reciprocal rod having an enlarged portion and being provided with means to permit manual reciprocation of the rod by the driver of the vehicle, said enlarged rod portion normally out of engagement with said dog but adapted to engage the dog when the rod is reciprocated and thereby rock said dog upon its pivotal support and cause disengagement of the dog from said gear to permit free rotation of the drive shaft in both directions.

In testimony whereof we hereunto affix our signatures.

JOHN W. PLUNKETT.
EDWARD H. ROBERTS.